United States Patent [19]

Reynolds et al.

[11] 4,020,613

[45] May 3, 1977

[54] FASTENER

[76] Inventors: Frank L. Reynolds, 34 Lynn Drive, Monroe, Conn. 06468; Alfred C. Langer, Pleasant Rise No. 2, Brookfield, Conn. 06804

[22] Filed: July 2, 1975

[21] Appl. No.: 592,420

[52] U.S. Cl. .................................... 52/321; 52/584

[51] Int. Cl.² .......................................... F16B 5/00

[58] Field of Search .................. 52/754, 753 C, 584

[56] References Cited

UNITED STATES PATENTS

| | | | |
|---|---|---|---|
| 3,191,244 | 6/1965 | Burke | 52/754 |
| 3,661,410 | 5/1972 | Larson et al. | 52/754 |
| 3,712,653 | 1/1973 | Lehmann | 52/754 |

*Primary Examiner*—Wayne L. Shedd

[57] ABSTRACT

An improved fastener having a design which provides a reduced cost as a result of the use of stampings, fewer parts and easier assembly, and higher strength. The basic construction of the fastener assembly consists of a stamped single or double hook, mounted on an eccentric which is formed of two stamped pieces spot welded or otherwise affixed back-to-back, and mounted in a case of various constructions.

6 Claims, 5 Drawing Figures

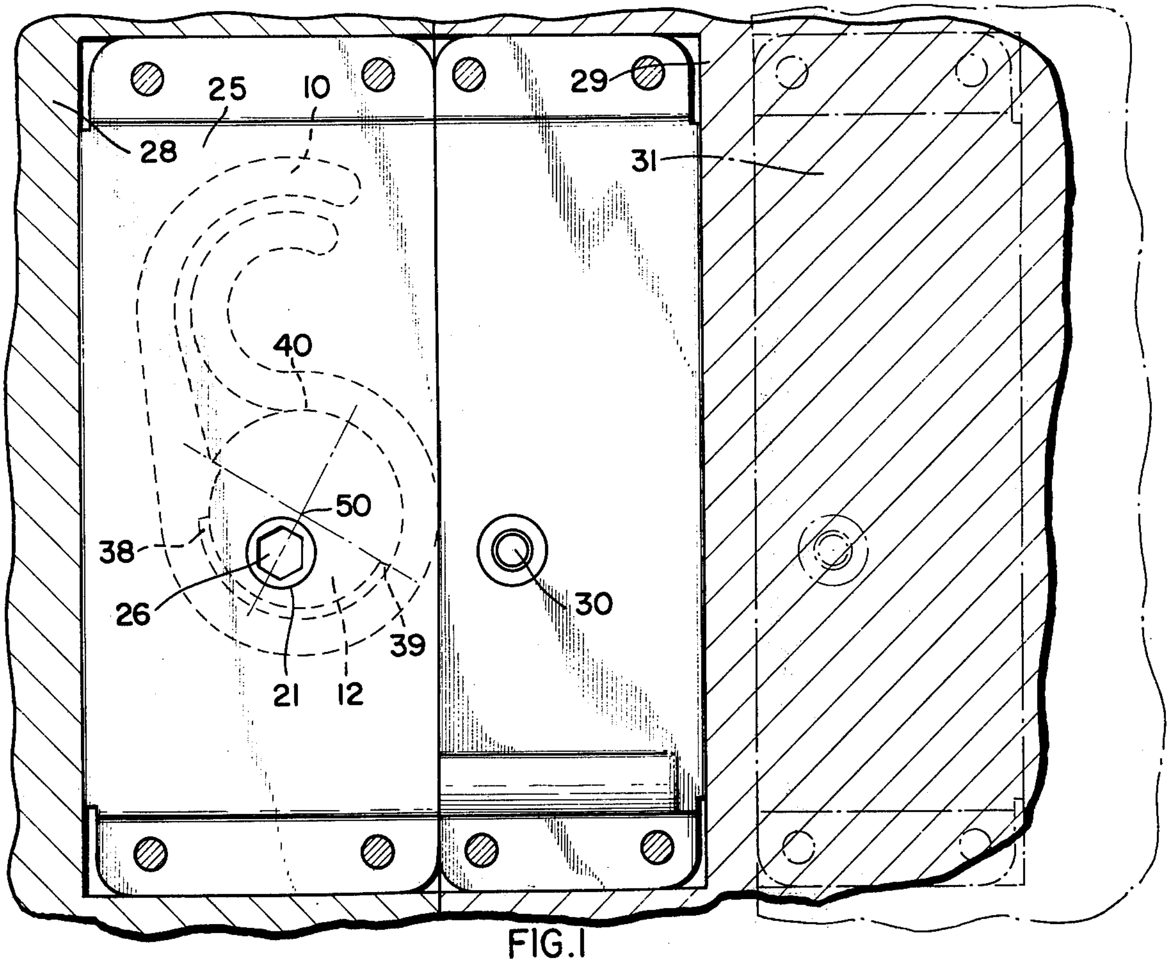
FIG.1
FIG.2
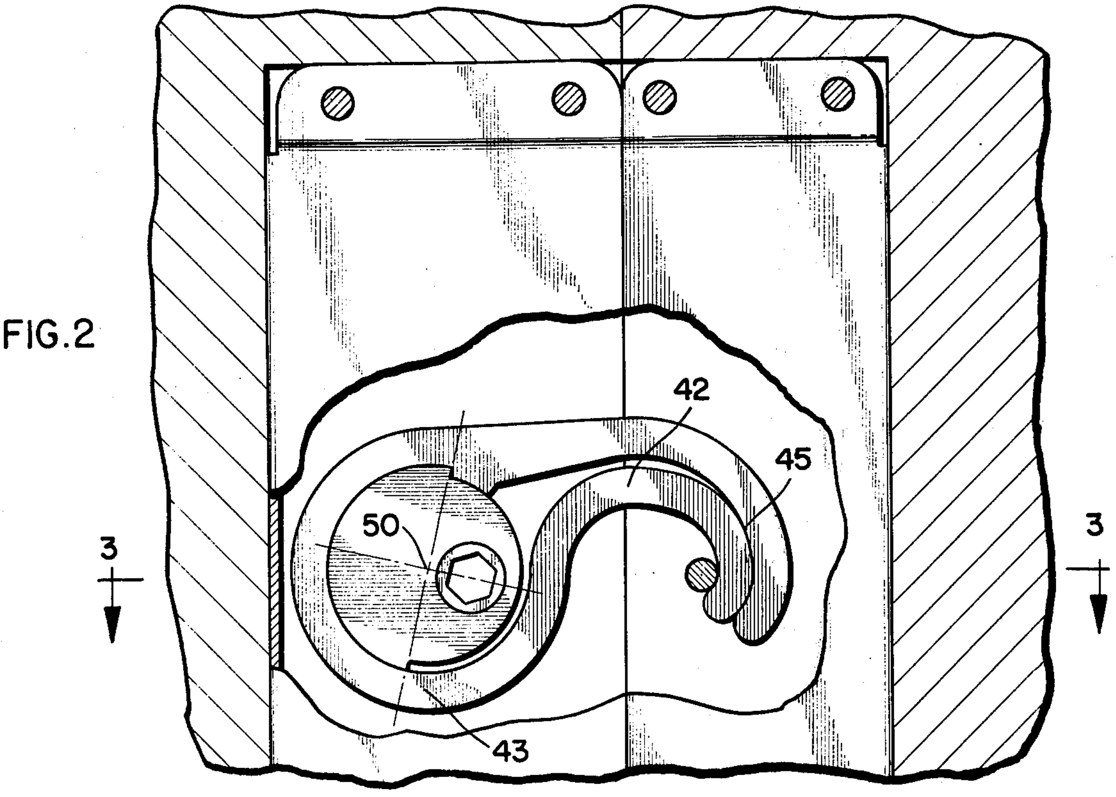

FASTENER

This invention relates to improved fasteners for removably securing panels and various other types of objects together.

The fastener of the present invention is similar to the fasteners disclosed in U.S. Pat. Nos. 3,309,115; 3,484,832; and 3,528,690, which are assigned to the assignee of the present invention. The fasteners disclosed in these prior patents have found substantial utility, however, in some applications, a lower cost fastener is needed. The fastener of the present invention is designed to fill this need. Its use is primarily intended for those applications requiring a low cost, quick acting, high strength latch with elasticity to aid in compression loading gaskets and for the absorbtion of tolerances.

The design of the fastener provides a reduced cost as a result of the use of stampings, fewer parts and easier assembly, and higher strength. The preferred construction of the fastener assembly consists of a stamped single or double hook, mounted on an eccentric, which is formed of two stamped pieces spot welded back-to-back, and mounted in a case of various constructions.

Accordingly, it is an object of the present invention to provide improved fasteners of a low cost and high strength design.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIG. 1 is a side plan view illustrating the fastener assembly installed in a pair of panels, with the fastener in a released position;

FIG. 2 is a side plan view like FIG. 1 with the fastener illustrated in latching position;

Similar reference characters refer to similar parts throughout the several views of the drawings.

Figure 4:
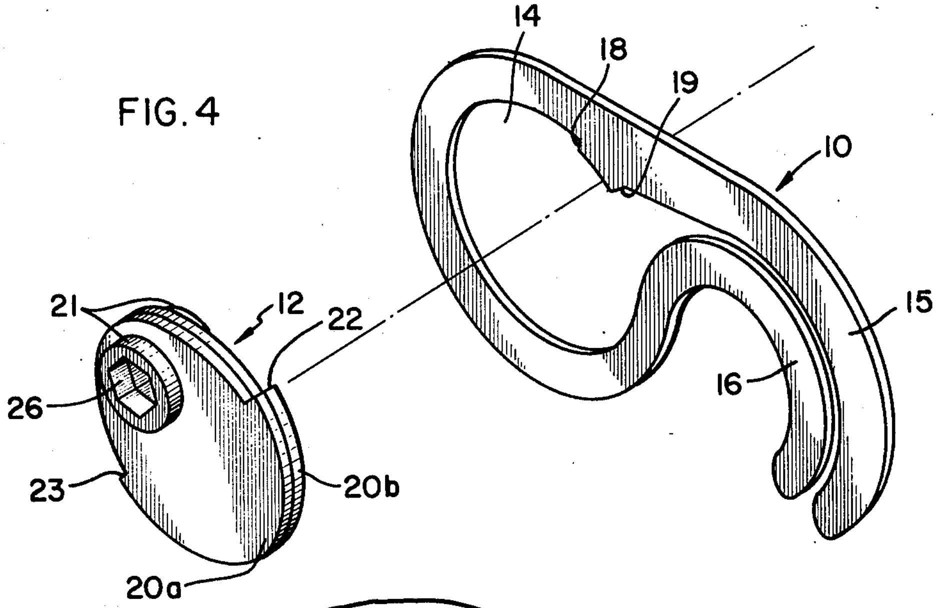
FIG. 4 is an exploded perspective view of the fastener and the eccentric.

Referring now to the drawings, in FIG. 4 there is illustrated a fastener 10 formed in accordance with one embodiment of the invention, and an eccentric 12. The fastener 10 is formed, preferably by stamping it, although it can be formed otherwise, and its size can be varied, as can be the type of material, that is, metal or plastic, and its thickness. By stamping the fastener 10 rather than otherwise forming it, its cost can be substantially reduced.

The fastener 10 generally is in the form of an openended loop which forms a bore 14, with the opposite ends of the loop forming a pair of arms 15 and 16 which extend substantially parallel with one another and are curved to form a pair of hooks. The bore 14 is formed slightly smaller in diameter than the eccentric 12 so that the peripheral edges of the bore 14 frictionally grip the circumference of the eccentric 12, for reasons explained more fully below. A generally rectangular-shaped projection is provided interiorly of the bore 14, with the opposite side edges 18 and 19 of this projection providing shoulders or stops which are engageable by the eccentric to latch and release the fastener 10.

The eccentric 12 can be molded or die cut but preferably it also is stamped and is formed of two identical halves 20*a* and 20*b*, each of which is circular in shape and has an extrusion 21 on it which is positioned axially off-center to provide an eccentric motion when the eccentric is rotated. The extrusions 21 have a hex-shaped bore 26 in them for receiving a hex key for rotating the eccentric 12. The two halves 20*a* and 20*b* are spot welded or otherwise affixed back-to-back, with the extrusions 21 axially aligned and projecting in opposite directions. It may be noted that the two halves 20*a* and 20*b*, or the eccentric 12, have a reduced diameter portion which extends approximately about one-half of the circumference thereto and provide a pair of shoulders which form stops 22 and 23. The eccentric 12 is fitted within the bore 14 in the fastener 10, as can be best seen in FIGS. 1 and 2, and then the fastener 10 and the eccentric 12 are installed in a casing or housing 25, with the extrusions 21 on the eccentric 12 extending through a pair of apertures 26 and 27 provided in the housing, as can be best seen in FIG. 3.

Figure 3:
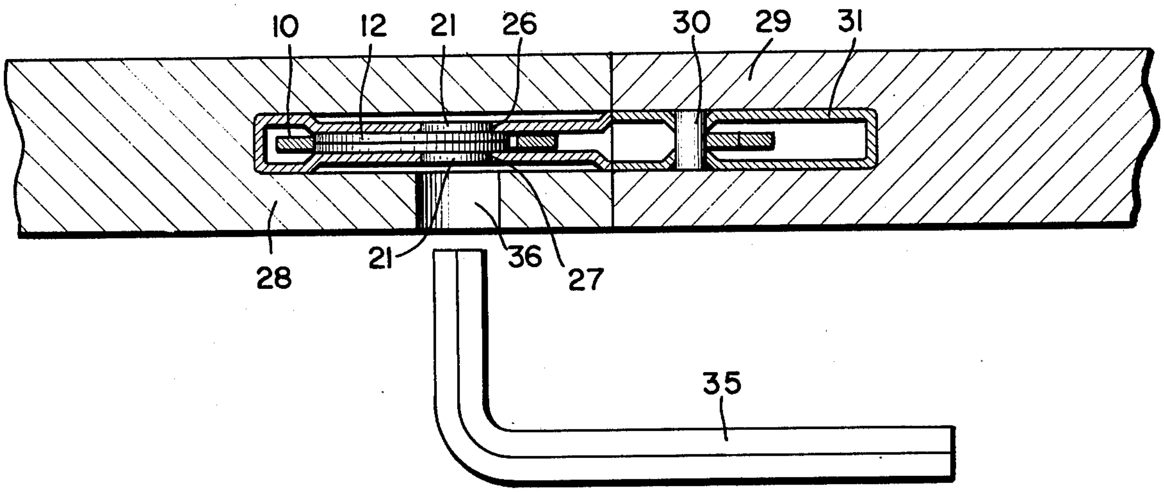
FIG. 3 is a sectional view taken along lines 3—3 of FIG. 2.

More particularly, the casing or housing 25 can be of various different shapes and constructions depending upon the application for the fastener. In this respect, the particular design of the housing is not of any great significance, so long as it is capable of supporting the fastener assembly, that is, the fastener 10 and the eccentric 12, to permit it to be operated, in the manner described below. In the illustrated embodiment, the housing 25 is generally rectangular-shaped, and in cross-section it is generally U-shaped with the fastener assembly sandwiched therein. The housing 25 also is illustrated, installed within the edges of a panel 28, so that the fastener assembly can be utilized to secure the abutting edges of the panel 28 and another panel 29 together, as illustrated in FIGS. 1–3. For this purpose, the fastener assembly functions in conjunction with an anchor 30 which may be a transversely positioned pin mounted in another similar type of housing 31 installed in the edge of the panel 29.

The operation of the fastener assembly is illustrated in FIGS. 1 and 2, and can be generally described as follows. As indicated above, the bore 14 is slightly smaller in diameter than the eccentric 12 so that the latter is frictionally gripped by the edges of the bore 14. Initially, the fastener assembly is generally positioned within the housing 25, as illustrated in FIG. 1. To operate it, a hex key 35 (FIG. 3) is inserted through an opening 36 provided in the panel, into the hexshaped bore 26 in the extrusion 21 on the eccentric 12. Rotating the eccentric 12 allows the centerline 50 of the whole fastener assembly to be rotated. The fastener 10 being frictionally attached to the eccentric 12 is caused to rotate with the eccentric 12 to rotate the arms or hooks 15 and 16 on the fastener 10 out of the housing 25 to engage the anchor 30, generally as illustrated in FIG. 2. During rotation, adequate friction to do so is obtained by the compression of the eccentric 12, particularly at the areas indicated by the reference numerals 38 and 39, which, being behind center of the eccentric, force the eccentric 12 into further contact with the edge of the bore 14, at the area indicated by the reference numeral 40.

At this time, with the arm or hook 16 engaged with the anchor 30, further rotation of the hex key 35 rotates the eccentric 12 within the bore 14 in the fastener 10, causing the bore 14 to be effectively pulled back into the housing 25 and thereby causing the fastener 10 to be stretched primarily in the area indicated by the reference numeral 42, between the anchor 30 and the eccentric 12 generally at the point or area indicated by the reference numeral 43. When the over-center position is reached, the loading point or area 43 is shifted to the area 43'.

As the hex key 35 is continued to be rotated, further rotation of the eccentric 12 within the bore 14 is prevented by the engagement of the stop 23 with the shoulder or stop 18 in the bore 14, and the fastener 10 is further stretched. Stretching of the arm or hook 16 produces engagement with the outer arm or hook 15 at the area generally indicated by the reference numeral 45, thereby increasing the spring load capacity and maintaining a tight frictional hold on the eccentric 12. During this operation, the abutting edges of the panels 28 and 29 are drawn together, and the elasticity of the fastener 10 aids in compression loading any gasket which would be placed between the abutting edges of the panels, or other objects.

Reversing the direction of rotation of the hex key 35 rotates the eccentric 12 so as to release the loading of the fastener 10 on the anchor 30. Friction carries the fastener 10 off of the anchor and back into the housing 25, at which point the back of the fastener 10 is stopped by the wall of the housing 25. The eccentric motion due to the continued rotation of the eccentric 12 continues until the stop 22 on the eccentric 12 engages with the stop 19 in the bore 14. At this time, rotation is stopped, leaving the fastener 10 in position for full extension during its next operation. While in this position, random swing of the fastener assembly is prevented by friction with the housing 25.

Figure 5:
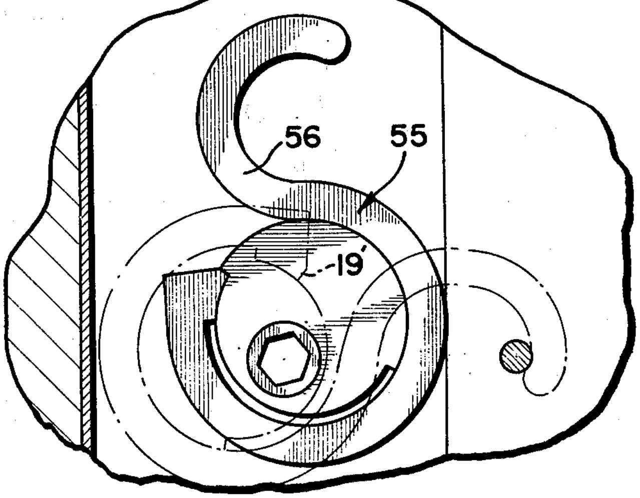
FIG. 5 is a side plan view of another embodiment illustrating the fastener in both a released and latching position.

In FIG. 5 there is illustrated a fastener assembly formed in accordance with another embodiment of the invention. This fastener assembly is generally the same as the one described above, however, in this case, the fastener 55 has only one arm or hook 56, with the other arm terminating along a line extending generally perpendicular to the edge of the stop 19'. The operation of this fastener assembly is the same as the operation described above. It will be appreciated, however, that this fastener assembly is primarily intended for use in applications where lighter loads are anticipated or required, but otherwise it provides all of the advantages of the fastener assembly of FIGS. 1–4.

From the above description, it can be seen that an improved fastener assembly which is reduced in cost but yet of high strength is provided with the change in design thereto. Assembly is simplified because of the fewer parts, hence, providing a still further reduction in the cost of the fastener assembly. The fastener assembly is quick acting, and provides elasticity to aid in compression loading gaskets and absorbing tolerances.

Now that the invention has been described, what is claimed as new and desired to be secured by Letters Patent is:

1. A fastener assembly which can be secured to an object and used in combination with anchor means secured to another object for securing the two objects together comprising: a fastener in the form of an open-ended loop which forms a bore with the opposite ends of said loop forming at least one arm which extends from the loop and is curved to form a hook, an integrally formed projection within said bore whose opposite edges form a pair of stops; an eccentric member disposed within said bore formed by said loop and having a reduced diameter portion which extends about substantially one-half of its circumference and forms a pair of stops which are engageable with said stops on said fastener, the engagement of respective pairs of said stops preventing further rotation of said eccentric member within said bore; said bore being slightly smaller in diameter than said eccentric member so that the peripheral edges thereof frictionally grip the circumference of said eccentric member, and means retaining said fastener and said eccentric in operable assembled relation, whereby rotating said eccentric member will cause said fastener to rotate to engage said hook with said anchor means, further rotation of said eccentric member rotating said eccentric member within said bore such as to stretch said hook engaged with said anchor means, the stretching of said hook increasing the spring load capacity of said fastener and maintaining tight frictional hold on said eccentric member, and said hook being releasably disengaged from said anchor means by reversing the rotation of said eccentric member.

2. The fastener assembly of claim 1, wherein said fastener is stamped from sheet material.

3. The fastener assembly of claim 2, wherein said eccentric member is formed from two circular-shaped pieces which are stamped from sheet material and affixed together, each of said pieces having a stamped extrusion provided off-center thereof with a keyed bore therein for receiving a key member for rotating the eccentric member.

4. A fastener assembly which can be secured to an object and used in combination with anchor means secured to another object for securing the two objects together comprising: a fastener in the form of an open-ended loop which forms a bore with the opposite ends of said loop forming a pair of arms which extend substantially concentrically with one another and are curved to form a pair of hooks, an integrally formed projection within said bore whose opposite edges form a pair of stops; an eccentric member disposed within said bore formed by said loop and having a reduced diameter portion which extends about substantially one-half of its circumference and forms a pair of stops which are engageable with said stops on said fastener, the engagement of respective pairs of said stops preventing further rotation of said eccentric member within said bore; said bore being slightly smaller in diameter than said eccentric member so that the peripheral edges thereof frictionally grip the circumference of said eccentric member, and means retaining said fastener and said eccentric in operable assembled relation whereby rotating said eccentric member will cause said fastener to rotate to engage said hook with said anchor means, further rotation of said eccentric member rotating said eccentric member within said bore such as to stretch said hook engaged with said anchor means, the stretching of said hook increasing the spring load capacity of said fastener and maintaining tight frictional hold on said eccentric member, and said hook being releasably disengaged from said anchor means by reversing the rotation of said eccentric member.

5. The fastener assembly of claim 4 wherein said fastener is stamped from sheet material.

6. The fastener assembly of claim 5, wherein said eccentric member is formed from two circular-shaped pieces which are stamped from sheet material and affixed together, each of said pieces having a stamped extrusion provided off-center thereof with a keyed bore therein for receiving a key member for rotating the eccentric member.

* * * * *